Aug. 23, 1960     F. O. WORDEN     2,949,885
CHEMICAL APPLICATOR FOR LIVE STOCK
Filed Aug. 8, 1957

INVENTOR
FLOYD O. WORDEN

BY *Shoemaker & Mattare*

ATTORNEYS

United States Patent Office 2,949,885
Patented Aug. 23, 1960

2,949,885

CHEMICAL APPLICATOR FOR LIVE STOCK

Floyd O. Worden, Alliance, Nebr.
(115 E. 18th St., Grand Island, Nebr.)

Filed Aug. 8, 1957, Ser. No. 676,994

11 Claims. (Cl. 119—157)

This invention relates to improvements in liquid chemical applicators adapted for applying a chemical insecticide to the hides of live stock.

In existing devices of this nature, as exemplified in my prior Patent No. 2,814,272, of November 26, 1957, the principle of operation is such that the horizontal reservoir tube or cylinder, beneath which the live stock pass, is rotated by contact with the animal or animals and, as a consequence, dispensing openings normally located in the uppermost portion of the reservoir are rotated to a point at which the liquid chemical flows from the reservoir into a surrounding absorbent layer, which in turn directs the liquid to a depending absorbent apron which directly contacts the backs of the live stock. Naturally, with this arrangement, the quantity of insecticide flowing from the reservoir is not positively controlled. For instance, dependent upon the level of insecticide within the reservoir, the amount by which the tube or reservoir must be rotated in order to bring the openings below the insecticide level therein will vary and as long as the openings are below the insecticide level, the fluid will continue to flow from the reservoir. Consequently, it is possible with such an arrangement that more than the desired or necessary quantity of the insecticide will be applied to the absorbent material and be wasted.

Accordingly, it is of primary concern in connection with this invention to provide means for limiting the amount of insecticide which flows from the reservoir at any one time so as to conserve the liquid chemical and prevent undue wasting thereof.

More specifically, an object of this invention is to provide means within a rotatable, horizontal reservoir tube which limits the flow of insecticide therefrom upon each rotational movement thereof as effected by the live stock passing under the reservoir and engaging the same with their backs.

Still another object of this invention is to provide an improved form of applicator for chemical insecticides in which a horizontal, rotatable reservoir tube is provided with a series of openings along its uppermost portion, each of the openings being provided with a tube depending therefrom and extending to a point within the reservoir adjacent the lowermost portion thereof and wherein each of such tubes is provided with a laterally bent free end portion located remote from the corresponding opening in the reservoir so as to insure the flow of chemical insecticide outwardly of the reservoir in response to rotation thereof so as to bring the tube to a position in which it is horizontally disposed.

Still another object of this invention is to provide an improved liquid chemical insecticide applicator for live stock embodying a horizontal, rotatable reservoir cylinder or tube which employs means limiting the amount of chemical dispensed therefrom and wherein such means is so constructed and arranged as to apply a chemical whenever the reservoir tube is rotated more than about 90° and wherein the amount of chemical applied is limited in quantity.

A further object of this invention resides in the provision of applicator means of the character described wherein the reservoir is provided with a series of openings normally disposed in the uppermost region thereof, each pair of openings having a pair of cooperating tubes depending therefrom in substantially parallel relationship to each other toward the lowermost portion and within the reservoir and wherein the pairs of tubes are provided with oppositely directed laterally bent end portions which are disposed adjacent the lowermost portion of the reservoir so that when the reservoir is rotated in one direction, one tube of each pair will cause fluid to flow outwardly through its corresponding opening and the other tube of each pair will apply liquid upon rotation in the other direction of the reservoir.

With the above and other objects in view, the invention consists in the construction and novel combination and arrangement of parts hereinafter fully described, illustrated in the accompanying drawing and pointed out in the claims hereto appended, it being understood that various changes in the form, proportions, and minor details of construction, within the scope of the claims, may be resorted to without departing from the spirit or sacrificing any of the advantages of the invention.

Figure 1:
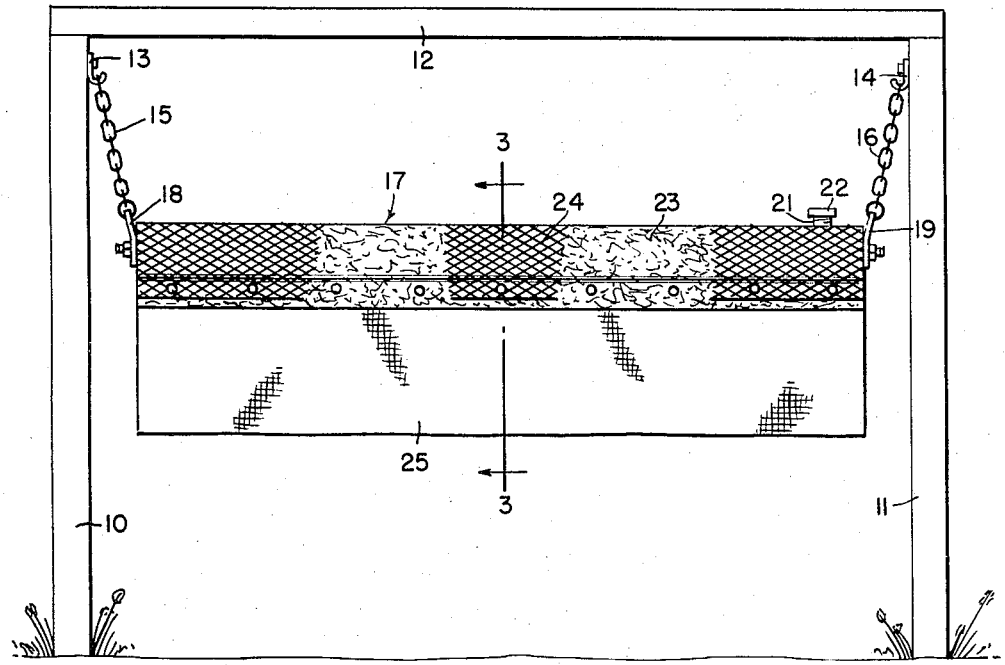
Fig. 1 is an elevational view showing an applicator constructed in accordance with this invention in operative position.

Referring at this time more particularly to Fig. 1, reference numerals 10 and 11 indicate respectively a pair of standards or uprights which are affixed in the region in which live stock are present and which are interconnected at their upper ends by a cross piece member 12 to rigidify the assembly. The uprights 10 and 11 may be provided adjacent their upper ends with a pair of hook or spoke elements 13 and 14 suitably fastened thereto and from which depend short lengths of chain 15 and 16 by means of which the applicator assembly indicated generally by the reference character 17 is supported freely between the uprights. The lower ends of the chains 15 and 16 carry bracket elements 18 and 19 which, as more fully described hereinafter, rotatably support the applicator assembly 17 about a horizontal, longitudinal axis so as to permit rotation of the applicator assembly.

Figure 2:
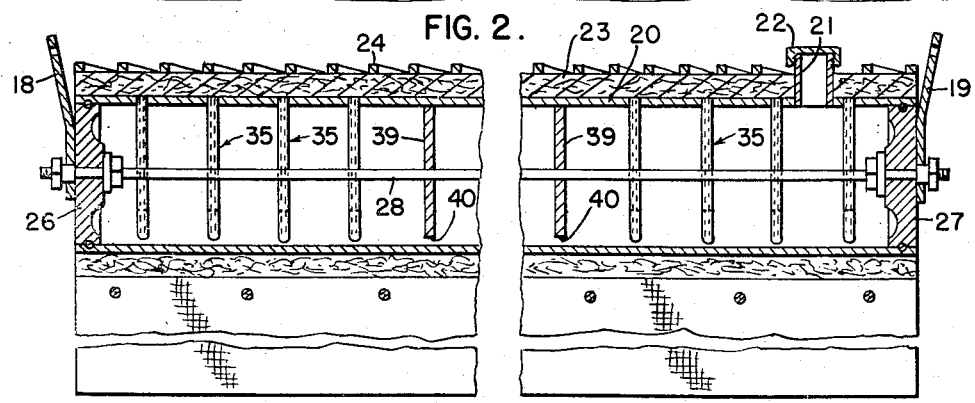
Fig. 2 is an enlarged longitudinal section taken through the assembly shown in Fig. 1.

The applicator assembly consists essentially of an elongate tubular or cylindrical reservoir 20, see Fig. 2, which is provided with a filler neck 21 and suitable closure cap 22 and which is adapted to contain a supply of liquid chemical insecticide. The reservoir is provided with an outer covering or layer of absorbent material 23 and in surrounding relation thereto a layer of metallic mesh material 24, such as expanded metal, wire mesh or the like. Suitably secured to the applicator assembly is a depending apron element 25 which is of absorbent material and the apron 25 at least is suspended at such a height that it will be engaged by the backs of live stock passing thereunder. The purpose of the expanded metal or mesh material 24 is to induce the live stock to pass under the applicator assembly and for this reason it is preferred that the assembly 17 itself be suspended at such a height that the live stock can scratch their backs with the mesh material 24. The applicator 17 is suspended in such a position that it is disposed substantially horizontally and the principle of operation is such that when the live stock pass under and engage the apron and applicator, the applicator will be rotated or turned about its longitudinal axis, due to the manner in which it is suspended by the chains, and in response to this movement a certain amount of the chemical or liquid insecticide within the reservoir 20 will be applied to the absorbent layer 23 surrounding the reservoir which will become saturated and direct the liquid to the absorbent apron 25 which in turn will apply the liquid insecticide to the backs of the animals.

Figure 3:
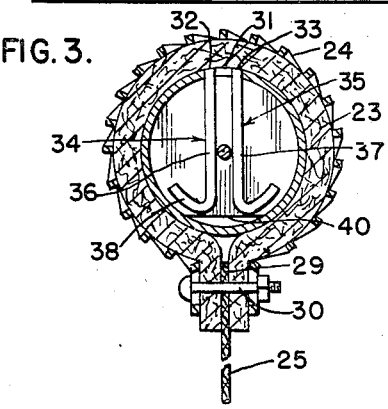
Fig. 3 is an enlarged transverse sectional view taken substantially on the plane of section line 3—3 in Fig. 1.
Figure 4:
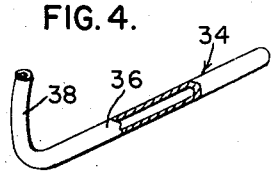
Fig. 4 is an enlarged perspective view of one of the applicator tubes.

As shown most clearly in Figs. 2 and 3, the reservoir 20 is provided with end closure elements 26 and 27 which seal the opposite ends of the reservoir and which are held in place by a longitudinally extending tie rod element 28 and associated nuts as will be readily apparent. The previously mentioned support brackets 18 and 19 are rotatably received on opposite free end portions of the tie rod 28 which project outwardly beyond the end caps 26 and 27 so that the reservoir is freely rotatably suspended thereby.

Figs. 2 and 3 more clearly illustrate the absorbent layer 23 which immediately surrounds the reservoir and which has its opposite free edge portions disposed in sandwiched relationship to the upper edge 29 of the apron 25. The expanded metal or coarse hard covering surrounding the layer 23 is preferably arranged such that its opposite free edges overlap the opposite edges of the layer 23 and fastening bolts 30 serve to maintain the relative members in operative position relative to each other. Obviously, when the layer 23 becomes saturated, some of the liquid will flow therefrom to the apron assembly and maintain the latter in a moist condition.

Due to the weight of the apron 25, the reservoir will normally hang in one position and the uppermost portion 31 thereof is provided with a series of pairs of openings 32 and 33 which constitute the means by which the fluid within the reservoir can pass therefrom and saturate the layer 23. Associated with each pair of openings 32 and 33 are pairs of tube elements 34 and 35 which are so constructed and arranged as to permit only a limited quantity of the insecticide within the reservoir to be applied to the layer 23 at any one rotational movement of the reservoir. Further, these tubes are so arranged as to apply the fluid to the layer 23 at any time that the reservoir has been rotated substantially 90° from the normal position shown in Fig. 3. For this purpose, the main body portions 36 and 37 of the tubes are disposed substantially vertical and parallel to each other and are projected through the openings 32 and 33 at the uppermost portion of the reservoir and depend therefrom toward the lowermost portion of the reservoir. Each tube is provided at its lower end with a laterally bent free end portion 38 and both ends of the tubes are open, one end being open to communicate within the confines of the reservoir and the other end opening exteriorly thereof.

By having the free ends 38 of each pair of tubes extend in opposite directions, one of the tubes will apply liquid to the absorbent layer 23 in each direction of rotation of the reservoir relative to its normal position shown in Fig. 3 and the laterally bent end portions 38 assure that the assembly will apply only a limited amount of liquid insecticide each time the reservoir is rotated in one direction or the other the requisite amount, that is, substantially 90° or greater, and as soon as the liquid has been dispensed from the various tubes, no more insecticide will flow from the reservoir onto the surrounding absorbent layer 23 even if the reservoir remains in the rotated position wherein the openings 32 and 33 would be below the level of liquid contained therein.

To prevent surging of the liquid within the reservoir, a series of baffle plates 39 may be provided, each of which is provided with a cut-away lower edge portion 40 providing continuous communication through the reservoir but preventing any undue surging of the liquid therein.

Obviously, the exact amount of insecticide dispensed at each time during rotational movement of the reservoir is dependent upon the particular fluid level within the reservoir but at least some insecticide will flow to the absorbent layer 23 unless the fluid level is extremely low. Also, the amount of chemical flowing from the reservoir when the same is rotated with any given level of insecticide therein may be varied by fitting a greater or lesser number of tubes 34 and 35 and/or by fitting tubes having larger internal diameters.

I claim:

1. A liquid chemical applicator for livestock adapted to be suspended in a vertically spaced, horizontally disposed position and rotatable about a substantially horizontal axis comprising an elongate tubular reservoir, an apron connected with and depending from and extending longitudinally of said reservoir, the weight of such apron normally maintaining said reservoir in a predetermined position, said reservoir having a series of longitudinally spaced openings along the uppermost portion thereof when in said predetermined position, means exteriorly of the reservoir for conducting liquid from said openings to the apron, tube elements within the reservoir each connected at one end with one of said openings and depending therefrom and extending substantially diametrically of the reservoir toward the lowermost portion of said reservoir, each of said tubes having a terminal portion of its other end reverted to extend in the transverse direction of the reservoir and each tube being open throughout its length, and means whereby the said reservoir may be filled with liquid.

2. The assembly as defined in claim 1 wherein said openings are arranged in corresponding pairs such that the tube elements are correspondingly arranged in pairs, the laterally bent lower end of one tube element in each of such pairs facing in one direction at right angles to the longitudinal axis of the reservoir and the other tube of each pair having its laterally bent lower end portion facing in the opposite direction.

3. A chemical applicator for live stock adapted to be suspended in a vertically spaced, horizontally disposed position and rotatable about a substantially horizontal axis comprising an elongate tubular reservoir having a layer of absorbent material surrounding the same, an apron depending from and extending longitudinally of said reservoir and in contact with said absorbent layer and with the weight of such apron normally maintaining said reservoir in a predetermined position, said reservoir having a series of longitudinally spaced openings along the uppermost portion thereof when in said predetermined position, tube elements each connected at one end with one of said openings and depending therefrom toward the lowermost portion of said reservoir, the lowermost end of each of said tubes being bent to extend in the transverse direction of the reservoir and each tube being open throughout its length, certain of said tubes having their lower, laterally bent end portions facing in one direction toward one side of said reservoir and certain of the tubes having their lower, laterally bent end portions facing toward the opposite side of said reservoir, and means for filling said reservoir with liquid insecticide.

4. A chemical applicator for live stock comprising an elongate hollow cylinder having its opposite ends closed by end plates, means on said end plates for suspending said cylinder in a horizontal position to be rotatable about its longitudinal axis, a layer of absorbent material surrounding said cylinder, a generally rectangular apron secured along one edge thereof to said cylinder in contact with said absorbent layer and said apron extending longitudinally of said cylinder, the weight of said apron being such as to normally dispose the same in lowermost depending position, the uppermost portion of said cylinder being provided with a series of longitudinally spaced openings and there being a tube fitted within each of said openings such as to be disposed substantially flush with the outer surface of said cylinder, each tube extending substantially vertically downwardly from its associated opening and terminating at its lower end adjacent the lowermost inner surface of the cylinder in a laterally bent end portion with each tube being disposed in a plane disposed at substantially right angles to the longitudinal axis of the cylinder and each tube being continuously open from one end thereof to the other, and filler means for filling said cylinder with a quantity of liquid insecticide.

5. The assembly as defined in claim 4 wherein said openings are arranged in corresponding pairs such that the tube elements are correspondingly arranged in pairs, the laterally bent lower end of one tube element in each of such pairs facing in one direction at right angles to the longitudinal axis of the reservoir and the other tube element of each pair having its laterally bent lower end portion facing in the opposite direction.

6. A chemical applicator for live stock comprising an elongate hollow cylinder having its opposite ends closed by end plates, means on said end plates for suspending said cylinder in a horizontal position to be rotatable about its longitudinal axis, a layer of absorbent material surrounding said cylinder, a generally rectangular apron secured along one edge thereof to said cylinder in contact with said absorbent layer and said apron extending longitudinally of said cylinder, the weight of said apron being such as to normally dispose the same in lowermost depending position, the uppermost portion of said cylinder being provided with a series of longitudinally spaced openings and there being a tube fitted within each of said openings such as to be disposed substantially flush with the outer surface of said cylinder, each tube extending substantially vertically downwardly from its associated opening and terminating at its lower end adjacent the lowermost inner surface of the cylinder in a laterally bent end portion with each tube being disposed in a plane disposed at substantially right angles to the longitudinal axis of the cylinder and each tube being continuously open from one end thereof to the other, certain of said tubes having their laterally bent end portions projecting toward one side of said cylinder and the remainder of said tubes having their laterally bent end portions projecting towards the other side of said cylinder, and filler means for filling said cylinder with a quantity of liquid insecticide.

7. An insecticide assembly for live stock comprising vertically extending support means having a pair of flexible elements depending therefrom, an elongate tubular reservoir disposed between said uprights and in a substantially horizontal position therebetween, means rotatably suspending the opposite ends of said reservoir from the depending ends of said flexible elements, said reservoir being covered by a layer of an absorbent material and having a depending, longitudinally extending absorbent apron thereon whereby the apron, due to its weight, normally maintains the reservoir in a predetermined position relative to its axis of rotation, said reservoir having a series of longitudinally spaced openings in the uppermost region thereof and each such opening being filled by the upper end portion of an open tube element, each tube element depending substantially vertically from its associated opening within said reservoir, and terminating at its lower end in a laterally bent end portion disposed in close adjacency to the lowermost inner surface of the reservoir and conforming generally in contour thereto, and means for filling said reservoir with a predetermined quantity of liquid insecticide.

8. The assembly as defined in claim 7 wherein said openings are arranged in corresponding pairs such that the tube elements are correspondingly arranged in pairs, the laterally bent lower end of one tube element in each of such pairs facing in one direction at right angles to the longitudinal axis of the reservoir and the other tube of each pair having its laterally bent lower end portion facing in the opposite direction.

9. An insecticide assembly for live stock comprising vertically extending support means having a pair of flexible elements depending therefrom, an elongate tubular reservoir disposed between said uprights and in a substantially horizontal position therebetween, means rotatably suspending the opposite ends of said reservoir from the depending ends of said flexible elements, said reservoir being covered by a layer of an absorbent material and having a depending, longitudinally extending absorbent apron thereon whereby the apron, due to its weight, normally maintains the reservoir in a predetermined position relative to its axis of rotation, said reservoir having a series of longitudinally spaced openings in the uppermost region thereof and each such opening being filled by the upper end portion of an open tube element, each tube element depending substantially vertically from its associated opening within said reservoir, and terminating at its lower end in a laterally bent end portion disposed in close adjacency to the lowermost inner surface of the reservoir and conforming generally in contour thereto, certain of said tube elements having their laterally bent lower end portions facing in one direction in a plane at right angles to the longitudinal axis of said reservoir and the remaining tube elements having their laterally bent end portions facing in the opposite direction.

10. Apparatus for applying liquid chemical to live stock, comprising, in combination, an elongate receptacle forming a reservoir for such chemical, pivot means for hanging the receptacle from its ends substantially horizontally between spaced suspension members for turning movement by cattle passing therebeneath and striking thereagainst, the receptacle having two longitudinal rows of longitudinally spaced liquid outlet openings in the top thereof, the rows being relatively closely spaced and upon opposite sides of a vertical longitudinal, medial plane of the receptacle, a liquid absorbing apron suspended from and extending lengthwise of the lower wall of the receptacle, means on and exteriorly of the receptacle for receiving the liquid from said outlet openings and delivering it to the apron, and a plurality of tubes within the receptacle each connected at one end in an outlet opening and extending across the receptacle substantially parallel to said plane to the lower portion thereof and terminating in a laterally directed portion and said portions of the tubes connected with one row of openings being oppositely directed from the said portions of the tubes connected with the other row of openings, said tubes functioning upon a prescribed movement of the receptacle by cattle striking thereagainst to take up a portion of the liquid from the lowermost portion of the receptacle and deliver the liquid directly to the said receiving means.

11. Apparatus for applying liquid chemical to live stock, comprising, in combination, an elongate cylindrical receptacle forming a reservoir for the chemical, pivot means for hanging the receptacle substantially horizontally from its ends between spaced suspension members for turning on a longitudinal axis by cattle passing therebeneath and striking thereagainst, a liquid absorbing apron attached to the normally lower wall portion of the receptacle and extending longitudinally of the receptacle for suspension therefrom, the normally longitudinal upper wall portion of the receptacle having a liquid outlet therethrough, a conduit means forming a separate entity from and within the receptacle and attached and suspended therein solely from said normally longitudinal upper wall portion and having an inlet end located in the lower portion of the receptacle for picking up liquid and transferring the same to said liquid outlet, the said conduit means lying in close proximity to a vertical plane passing longitudinally medially through the receptacle and being adapted to function upon a prescribed extent of turning movement of the receptacle by cattle passing thereunder and striking thereagainst, and means carried by the receptacle and connected with the apron for receiving liquid discharged from the liquid outlet and conveying the liquid to and for absorption by the apron.

References Cited in the file of this patent

UNITED STATES PATENTS

| | | |
|---|---|---|
| 1,049,339 | Byer | Jan. 7, 1913 |
| 1,382,066 | Curran | June 21, 1921 |
| 1,817,449 | Vaughan | Aug. 4, 1931 |
| 2,653,575 | Worden | Sept. 29, 1953 |
| 2,702,020 | Worden | Feb. 15, 1955 |
| 2,711,721 | Gray | June 28, 1955 |
| 2,814,272 | Worden | Nov. 26, 1957 |